United States Patent
Song et al.

(10) Patent No.: US 10,256,000 B2
(45) Date of Patent: Apr. 9, 2019

(54) STEAM GENERATOR LEVEL CONTROL SYSTEM AND METHOD OF PREVENTING OSCILLATION OF STEAM GENERATOR LEVEL

(71) Applicant: KEPCO ENGINEERING & CONSTRUCTION COMPANY, INC., Gyeonggi-do (KR)

(72) Inventors: In Ho Song, Seoul (KR); Myung Jun Song, Daejeon (KR); See Chae Jeong, Gyeonggi-do (KR); Ju Han Lee, Daejeon (KR); Shin Whan Kim, Daejeon (KR); Eung Seo Kim, Daejeon (KR)

(73) Assignee: KEPCO ENGINEERING & CONSTRUCTION COMPANY, INC., Gyeonggi-Do (KR)

( * ) Notice: Subject to any disclaimer, the term of this patent is extended or adjusted under 35 U.S.C. 154(b) by 395 days.

(21) Appl. No.: 14/981,407

(22) Filed: Dec. 28, 2015

(65) Prior Publication Data
US 2016/0189807 A1 Jun. 30, 2016

(30) Foreign Application Priority Data
Dec. 29, 2014 (KR) .......................... 10-2014-0192561

(51) Int. Cl.
*G21D 3/00* (2006.01)
*F22B 35/00* (2006.01)
(Continued)

(52) U.S. Cl.
CPC .......... *G21D 3/001* (2013.01); *F22B 35/004* (2013.01); *F22B 37/46* (2013.01); *F22D 5/30* (2013.01);
(Continued)

(58) Field of Classification Search
CPC .......... G21C 7/32; F22B 35/004; F22B 37/46; G21D 3/001; G21D 3/04; F22D 5/30; F22D 5/32
See application file for complete search history.

(56) References Cited

U.S. PATENT DOCUMENTS 6,938,584 B2    9/2005   Sohn et al.
8,811,560 B2    8/2014   Song et al.
(Continued)

FOREIGN PATENT DOCUMENTS

CN    1577636 A    2/2005
CN    102543235 A    7/2012
(Continued)

OTHER PUBLICATIONS

Chinese Application No. 201511005027.0 dated May 15, 2017.
Office Action dated May 15, 2017 of the Chinese Patent Application No. 201511005027.0.

*Primary Examiner* — Lily C Garner
(74) *Attorney, Agent, or Firm* — Nixon Peabody LLP; Jeffrey L. Costellia

(57) ABSTRACT

Provided are a method and system for improving control of a steam generator level for preventing oscillation of the steam generator level in a nuclear power plant. In order to prevent oscillation of a steam generator level and resultant shutdown of a nuclear reactor, which may be caused when a high-level priority control function is frequently and repeatedly turned on/off as the steam generator level is excessively increased, by improving a feedwater control system in the nuclear power plant, a proportional integral control value may be controlled to be reduced, and thus, output while a certain condition is met after a high-level priority mode is deactivated or a signal instructing to enter the high-level priority control mode may be controlled not to be output.

1 Claim, 6 Drawing Sheets

(51) Int. Cl.
*G21D 3/04* (2006.01)
*F22B 37/46* (2006.01)
*F22D 5/30* (2006.01)
*F22D 5/32* (2006.01)
*G21C 7/32* (2006.01)

(52) U.S. Cl.
CPC ............... *F22D 5/32* (2013.01); *G21D 3/04* (2013.01); *G21C 7/32* (2013.01); *Y02E 30/40* (2013.01)

(56) References Cited

U.S. PATENT DOCUMENTS

2012/0170702 A1\* 7/2012 Song .................... F22B 35/004
376/210
2014/0177772 A1 6/2014 Jeong et al.

FOREIGN PATENT DOCUMENTS

| CN | 103811090 A | 5/2014 |
| CN | 103900074 A | 7/2014 |
| JP | 5915898 A | 1/1984 |
| JP | S5915898 A | 1/1984 |
| JP | 2506224 B2 | 2/1992 |
| JP | 06308288 A \* | 11/1994 |
| KR | 20050003886 A \* | 1/2005 |
| KR | 2012-0033409 A | 4/2012 |
| KR | 20120033409 A | 4/2012 |
| KR | 10-2012-0076747 | 10/2012 |

\* cited by examiner

STEAM GENERATOR LEVEL CONTROL SYSTEM AND METHOD OF PREVENTING OSCILLATION OF STEAM GENERATOR LEVEL

CROSS-REFERENCE TO RELATED APPLICATION

This application claims the benefit of Korean Patent Application No. 10-2014-0192561, filed on Dec. 29, 2014, in the Korean Intellectual Property Office, the disclosure of which is incorporated herein in its entirety by reference.

BACKGROUND

Field

One or more exemplary embodiments relate to a method and system for improving control of a steam generator level for preventing oscillation of the steam generator level in a nuclear power plant, and more particularly, to a system and method of preventing oscillation of a steam generator level and resultant shutdown of a nuclear reactor, which may be caused when a high-level priority control function is frequently and repeatedly turned on/off as the steam generator level is excessively increased, by improving a feedwater control system in the nuclear power plant.

Description of the Related Art

A nuclear power plant consists of 100 or more systems respectively having individual functions. The systems are largely classified into a nuclear steam supply system (NSSS) that is based on a nuclear reactor, a turbine-generator system which is supplied with steam to operate a generator so as to produce electricity, and other subordinate facilities.

A nuclear power plant with a pressurized water reactor (PWR), which is currently mainly used as a nuclear power plant in Korea, consists of a primary system that is based on a nuclear reactor, a secondary system that includes a turbine, a steam generator, an electric generator, and a condenser, an engineered safeguard system that is to prepare for accidents, a power transmission and supply system, an instrumentation and control system, and other subsidiary systems.

Hot water generated by a nuclear reactor circulates through a heat-transfer pipe included in a steam generator, which is connected to the nuclear reactor through a coolant pipe, so as to transfer heat to feedwater flowing into the steam generator through another pipe, and then, returns to the reactor. A level of the feedwater in the steam generator should be appropriately maintained so that the steam generator easily performs this function.

A nuclear power plant generates a signal for shutdown of a nuclear reactor according to an increase or a decrease in a steam generator level so as to ensure safety.

However, if a transient event occurs in a nuclear power plant, since a shutdown margin of a nuclear reactor having a low steam generator level is relatively less than a shutdown margin of a nuclear reactor having a high steam generator level in a feedwater control system, there is a high possibility of shutdown of a nuclear reactor when a steam generator level is high.

Accordingly, a feedwater control system in the related art has a high-level override (HLO) function such that, if a steam generator level is equal to or higher than 85%, as shown in FIG. 1, all feedwater control valves are closed and a main feedwater pump is operated at a lowest speed by setting an output value of a feedwater control system to "0".

The HLO function is performed so that a high-level priority control mode is executed if a steam generator level is 85%, and then, deactivated if the steam generator level reaches 80%.

However, in a feedwater control system in a related art, if a signal for controlling a steam generator level is drastically switched to an output signal from a proportional integral controller when a high-level priority control mode is deactivated due to recovery of a steam generator level, since a high-level priority control function is frequently turned on/off as the steam generator level is changed, the steam generator level may oscillate. Thus, shutdown of a nuclear reactor having a high steam generator level may occur. Accordingly, a method of controlling a steam generator level to prevent oscillation of a steam generator level while a high-level priority control function is being performed is needed.

SUMMARY

One or more exemplary embodiments include a system and method of preventing drastic oscillation of a steam generator level which may occur when a high-level priority control mode is deactivated.

One or more exemplary embodiments include a non-transitory computer-readable recording storage medium having recorded thereon a computer program which, when executed by a computer, performs the method.

Additional aspects will be set forth in part in the description which follows and, in part, will be apparent from the description, or may be learned by practice of the presented embodiments.

According to one or more exemplary embodiments, a steam generator level control system configured to prevent oscillation of a steam generator level at a nuclear power plant includes: a comparator configured to compare a steam generator level with a predetermined level-set value; a proportional integral control output unit configured to generate a proportional integral control value by using an output from the comparator; a high-level priority control signal generator configured to output a signal instructing to enter a high-level priority control mode if the steam generator level is equal to or greater than first criteria, and output a signal deactivating the high-level priority control mode if the steam generator level is equal to or less than second criteria; and a high-level priority control signal receiver configured to control a control signal using a value of the proportional integral control output unit to be transmitted to a main feedwater pump and a feedwater control valve in a normal mode, obstruct a control signal using a value of the proportional integral control output unit in the high-level priority control mode, and control a predetermined output value to be transmitted to the main feedwater pump and the feedwater control valve, wherein the proportional integral control output unit controls to output a value obtained when the proportional integral control value is reduced for a certain time period after the high-level priority control mode is deactivated.

The proportional integral control output unit may include: a proportional integral controller configured to generate a proportional integral control value by using an output from the comparator; and an output reducer configured to control the proportional integral controller to reduce the proportional integral control value for a certain time period if a high-level priority control mode is deactivated according to a signal from the high-level priority control signal generator.

The proportional integral control output unit may include: a proportional integral controller configured to generate a proportional integral control value by using an output from the comparator; and an output reducer configured to receive the proportional integral control value, and reduce the proportional integral control value for a certain time period after a high-level priority control mode is deactivated according to a signal from the high-level priority control signal generator and output the reduced proportional integral control value to the high-level priority control signal receiver.

The output reducer may reduce the proportional integral control value at a certain rate or in correspondence with a certain value. In detail, the output reducer may reduce the proportional integral control value to half the proportional integral control value.

The output reducer may reduce the proportional integral control value for a predetermined time period, or until the steam generator level is reduced to a value equal to or less than a predetermined value after the high-level priority control mode is deactivated, or until the proportional integral control value is reduced to a value equal to or less than a predetermined value after the high-level priority control mode is deactivated.

The steam generator level control system may further include: a main feedwater pump speed controller configured to receive an output from the high-level priority control signal receiver and control a speed of the main feedwater pump; and a feedwater control valve opening controller configured to receive an output from the high-level priority control signal receiver and control a degree of opening the feedwater control pump.

According to one or more exemplary embodiments, a steam generator level control system configured to prevent oscillation of a steam generator level at a nuclear power plant includes: a comparator configured to compare a steam generator level with a predetermined level-set value; a proportional integral control output unit configured to generate a proportional integral control value by using an output from the comparator; a high-level priority control signal generator configured to output a signal instructing to enter a high-level priority control mode if the steam generator level is equal to or greater than first criteria, and output a signal deactivating the high-level priority control mode if the steam generator level is equal to or less than second criteria; and a high-level priority control signal receiver configured to control a control signal using a value of the proportional integral control output unit to be transmitted to a main feedwater pump and a feedwater control valve in a normal mode, obstruct a control signal using a value of the proportional integral control output unit in the high-level priority control mode, and control a predetermined output value to be transmitted to the main feedwater pump and the feedwater control valve, wherein the high-level priority control signal generator receives a proportional integral control value from the proportional integral control output unit, and controls a signal instructing to enter the high-level priority control mode not to be output until the proportional integral control value is reduced to a value equal to or less than a predetermined value after the high-level priority control mode is deactivated.

According to one or more exemplary embodiments, a non-transitory computer-readable recording storage medium having recorded thereon a computer program, when executed by a computer, performs the method.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
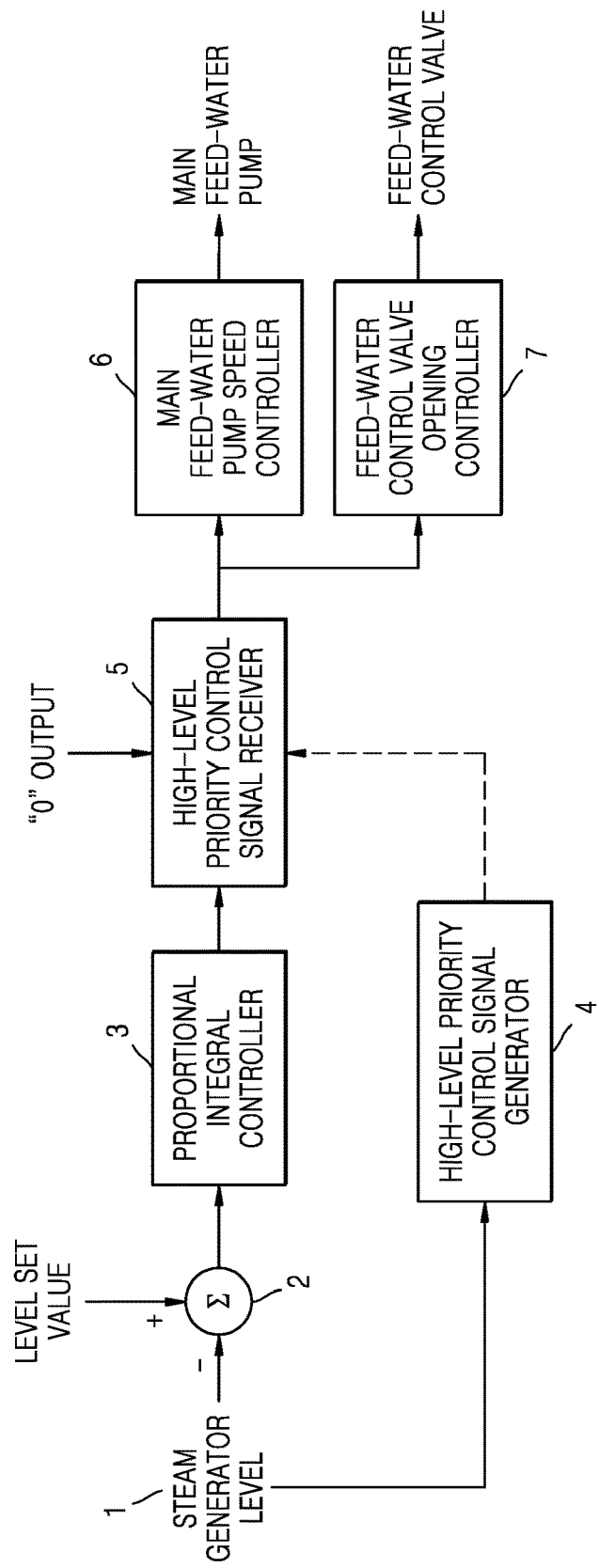
FIG. 1 is a block diagram of a steam generator level control system in a related art.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items The description, provided hereinafter, merely illustrates principles of the inventive concept. Therefore, those skilled in the art may implement the principles of the inventive concept and invent a wide variety of devices that are included in the concept and scope of the inventive concept, though not clearly described or illustrated herein. In addition, it is to be understood that all conditional terms and embodiments, listed herein, are intended only for the purpose of helping to understand the concept of the inventive concept, and are clearly not limited to the embodiment and states that are particularly enumerated herein. In addition, it may be understood that a detailed description that provides particular embodiments as well as the principles, perspectives, and embodiments of the inventive concept are intended to include structural and functional equivalents of the particular embodiments as well as the principles, perspectives, and embodiments of the inventive concept. Additionally, it may be understood that such equivalents include not only known equivalents but also equivalents that will be developed in the future, that is, all elements that are invented to perform the same functions regardless of structures.

Therefore, functions of various elements shown in the drawing that includes a processor or a functional block which is shown to have a concept similar to the processor may be provided by using not only dedicated hardware but also hardware with a capability to run appropriate software. If provided by the processor, the functions may be provided by a single dedicated processor, a single shared processor, or a plurality of individual processors, and some of the functions may be shared by such processors. In addition, terms such as a processor, control, or terms that have a concept similar thereto shall not be interpreted to exclusively quote hardware with a capability to run software, and shall be understood to implicitly include digital signal processor (DSP) hardware, read-only memory (ROM) for storing software, random access memory (RAM), and non-volatile memory without limitation, as well as other well-known hardware.

A purpose, advantages, and features of the inventive concept will become apparent from the following detailed description. In the description of the inventive concept, certain detailed explanations of well-known technology are omitted when it is deemed that they may unnecessarily obscure the essence of the inventive concept.

It will be further understood that the terms "comprises," "comprising," "includes," and/or "including," when used herein, specify the presence of components, but do not preclude the presence or addition of one or more other components, unless otherwise specified.

Hereinafter, the inventive concept will be described in detail by explaining embodiments of the inventive concept with reference to the attached drawings.

A general configuration of a steam generator level control system is described with reference to FIG. 1.

A comparator 2 compares a steam generator level value 1 of a steam generator, which is measured by a steam generator level measuring sensor included in the steam generator, to a level-set value. Then, a resultant value of the comparing is input to a proportional integral controller 3.

The steam generator level value 1 of the steam generator is input to a high-level priority control signal generator 4. If the steam generator level value 1 is equal to or greater than a predetermined value, for example, 85%, a signal instructing to enter a high-level priority control mode (a high-level priority control signal) is generated.

If a high-level priority control signal is generated by the high-level priority control signal generator 4, a high-level priority control signal receiver 5 prevents outputting of an output signal from the proportional integral controller 3, and controls a predetermined value to be output to a main feedwater pump speed controller 6 and a feedwater control valve opening controller 7 so that an output value of a flow rate requiring signal from a feedwater control system is 0.

In other words, the high-level priority control signal receiver 5 controls a signal commanding to close a feedwater control valve to be output to the feedwater control valve opening controller 7, and controls a signal instructing to operate a main feedwater pump at a lowest speed to be output to the main feedwater pump speed controller 6.

Additionally, if a high-level priority control mode is deactivated, the high-level priority control signal receiver 5 controls an output to be transmitted from the proportional integral controller 3 to the main feedwater pump speed controller 6 and the feedwater control valve opening controller 7.

Figure 2:
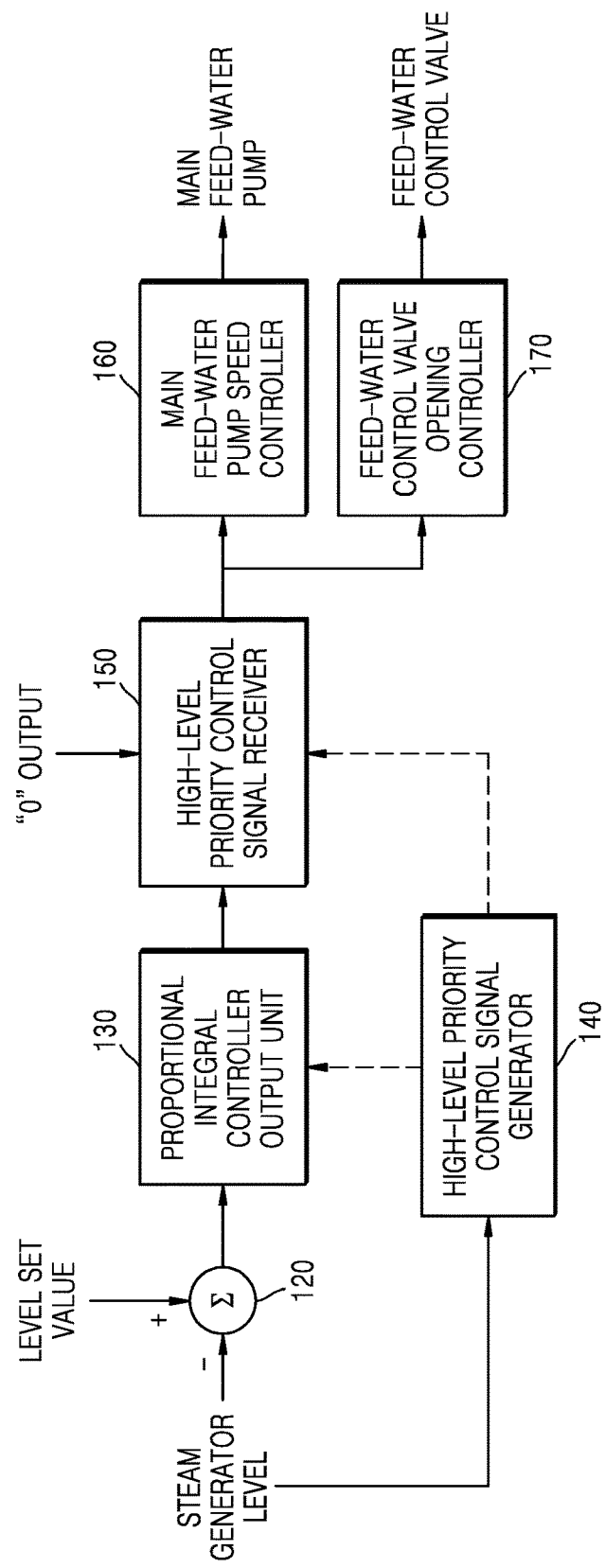
FIG. 2 is a block diagram of a steam generator level control system according to an exemplary embodiment.

FIG. 2 is a block diagram of a configuration obtained by improving the configuration shown in FIG. 1, according to an exemplary embodiment.

According to an exemplary embodiment, referring to FIG. 2, similarly to the configuration shown in FIG. 1, a steam generator level control system includes a comparator 120, a proportional integral control output unit 130, a high-level priority control signal generator 140, a high-level priority control signal receiver 150, a main feedwater pump speed controller 160, and a feedwater control valve opening controller 170.

According to an exemplary embodiment, the steam generator level control system is different from the steam generator level control system in the related art, shown in FIG. 1, in that a high-level priority control signal is transmitted to the proportional integral control output unit 130 as well as the high-level priority control signal receiver 150, and that the proportional integral control output unit 130 reduces an output value of the proportional integral controller 3 according to the high-level priority control signal.

Hereinafter, each element is described.

The comparator 120 receives a value of a steam-generator level from a sensor for measuring the steam-generator level, and outputs a resultant value obtained by comparing the value of the steam-generator level to a predetermined level-set value.

The high-level priority control signal generator 140 receives the value of the steam-generator level. Then, the high-level priority control signal generator 140 outputs a high-level priority control signal if the value of the steam-generator level is equal to or greater than a first predetermined value, and outputs a signal deactivating a high-level priority control mode (a high-level priority control deactivating signal) if the value of the steam-generator level is equal to or less than a second predetermined value.

The outputting of a high-level priority control deactivating signal may be performed by using a method of transmitting a signal other than a high-level priority control signal, or by using a method of repeatedly outputting a high-level priority control signal until a value of a steam generator level becomes equal to or greater than a first value, and then, reaches a second value, and stopping the outputting of the high-level priority level control signal if the value of the steam generator level becomes equal to or less than the second value.

Generally, the first value is a value obtained when a steam generator level becomes 85%, and a second value is a value obtained when the steam generator level becomes 80%. In other words, the first value and the second value may vary with characteristics of a nuclear power plant system. Both the first value and the second value may be changed by a facility manager with respect to the high-level priority control signal generator 140 and may be pre-stored.

The high-level priority control signal receiver 150 receives an output signal from the high-level priority control signal generator 140. If the high-level priority control signal receiver 150 receives a high-level priority control signal, the high-level priority control signal receiver 150 obstructs an output of a value received from the proportional integral control output unit 130, and outputs predetermined information.

Here, the predetermined information is information instructing an output value of a flow rate requiring signal from a feedwater control system to be 0. The predetermined information instructs the feedwater pump opening controller 170 to close a feedwater valve and instructs the main feedwater pump speed controller 160 to operate a main feedwater pump at a lowest speed.

Additionally, if a high-level priority control signal is not received or a high-level priority control deactivating signal is received, the high-level priority control signal receiver 150 controls to output a signal that was output from the proportional integral control output unit 130.

The main feedwater pump speed controller 160 receives a signal from the high-level priority control signal receiver 150 and outputs a signal for controlling a speed of the main feedwater pump.

The feedwater control valve opening controller 170 receives a signal from the high-level priority control signal receiver 150 and outputs a signal for controlling a degree of opening the feedwater control valve.

In other words, in a normal mode, the main feedwater pump speed controller 160 and the feedwater control valve opening controller 170 control a speed of the main feedwater pump and a degree of opening the feedwater control valve according to a value output to the proportional integral control output unit 130. In a high-level priority control mode, the high-level priority control signal receiver 150 obstructs an output from the proportional integral control output unit 130, and controls a speed of the main feedwater pump and a degree of opening the feedwater control valve according to additional information.

A function of controlling a speed of the main feedwater pump according to a received signal, which is performed by the main feedwater speed controller 160, and a function of controlling a degree of opening the main control valve, which is performed by the feedwater control valve opening controller 170, are well-known technology. Thus, a description thereof is not provided here.

The proportional integral control output unit 130 outputs a proportional integral control value that is generated in response to an output signal from the comparator 120 that is employed as an input value.

The proportional integral control output unit 130 changes an output proportional integral control value, according to a signal from the high-level priority control signal generator 140.

The proportional integral control output unit 130 includes a proportional integral controller 131 and an output reducer 132 to perform such a function.

The proportional integral controller 131 performs a same function as that of the proportional integral controller 3 included in the steam-generator level control system in the related art, which is described above. In other words, the proportional integral controller 131 outputs a proportional integral control value generated in response to an output signal from the comparator 120 that is employed as an input value.

The output reducer 132 controls the proportional integral controller 131 to output an output value of the proportional integral controller 131 without having to change the output value, or controls the proportional integral controller 131 to reduce an output value of the proportional integral controller 131 and output the reduced output value to the high-level priority control signal receiver 150, according to a signal from the high-level priority control signal generator 140.

In detail, if a high-level control signal is generated, and thus, the steam generator level control system operates in a high-level priority control mode, and then, the high-level priority control mode is deactivated, the output reducer 132 controls the proportional integral controller 131 to reduce an output from the proportional integral controller 131 and output the reduced output to the high-level priority control signal receiver 150.

This may prevent a phenomenon in which, after a high-level priority control mode is deactivated, the steam generator level control system returns to the high-level priority control mode as a feedwater speed is drastically increased, that is, a phenomenon in which a steam generator level oscillates repeatedly from a high level to a normal level.

Figure 3:
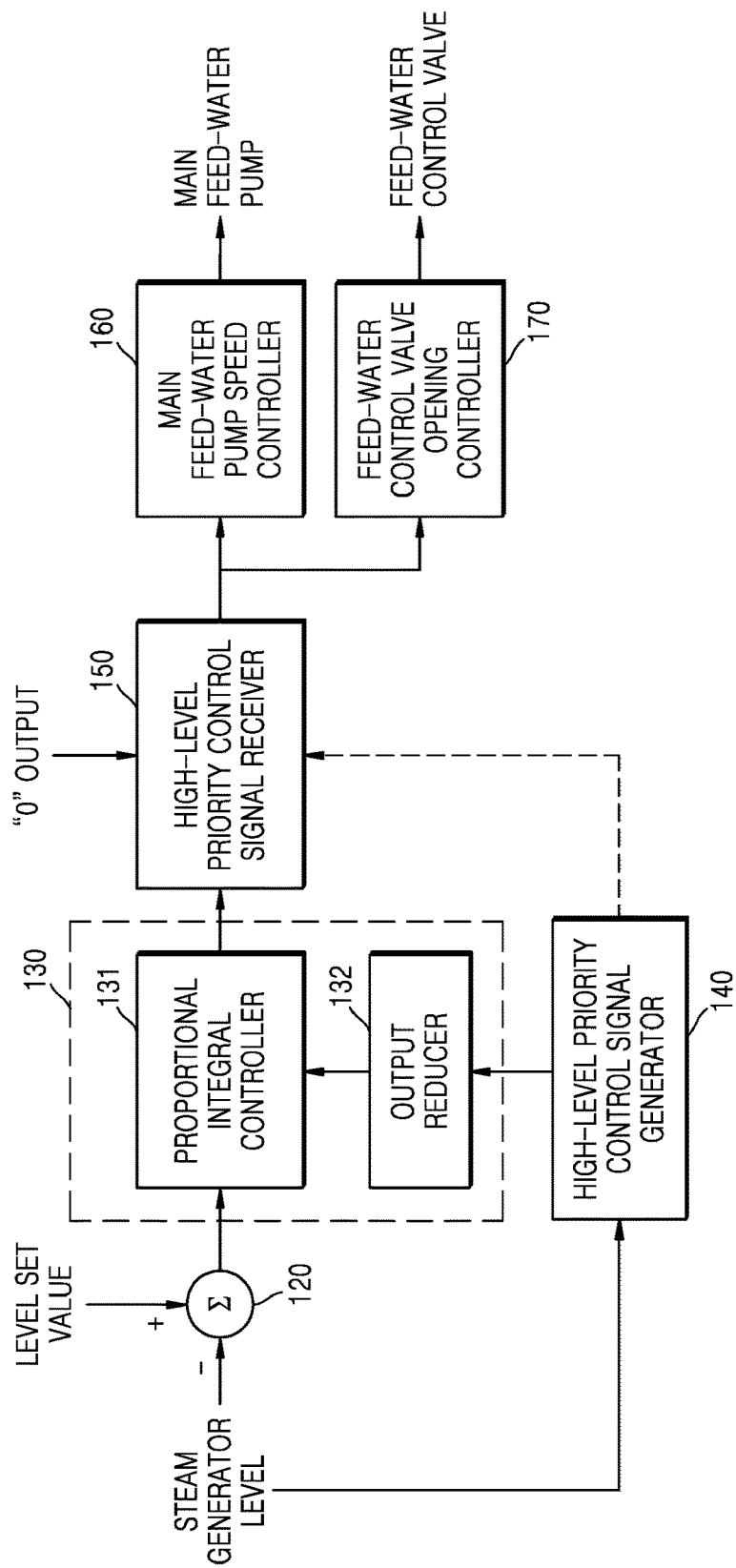
FIG. 3 illustrates an example of the embodiment described with reference to FIG. 2.
Figure 4:
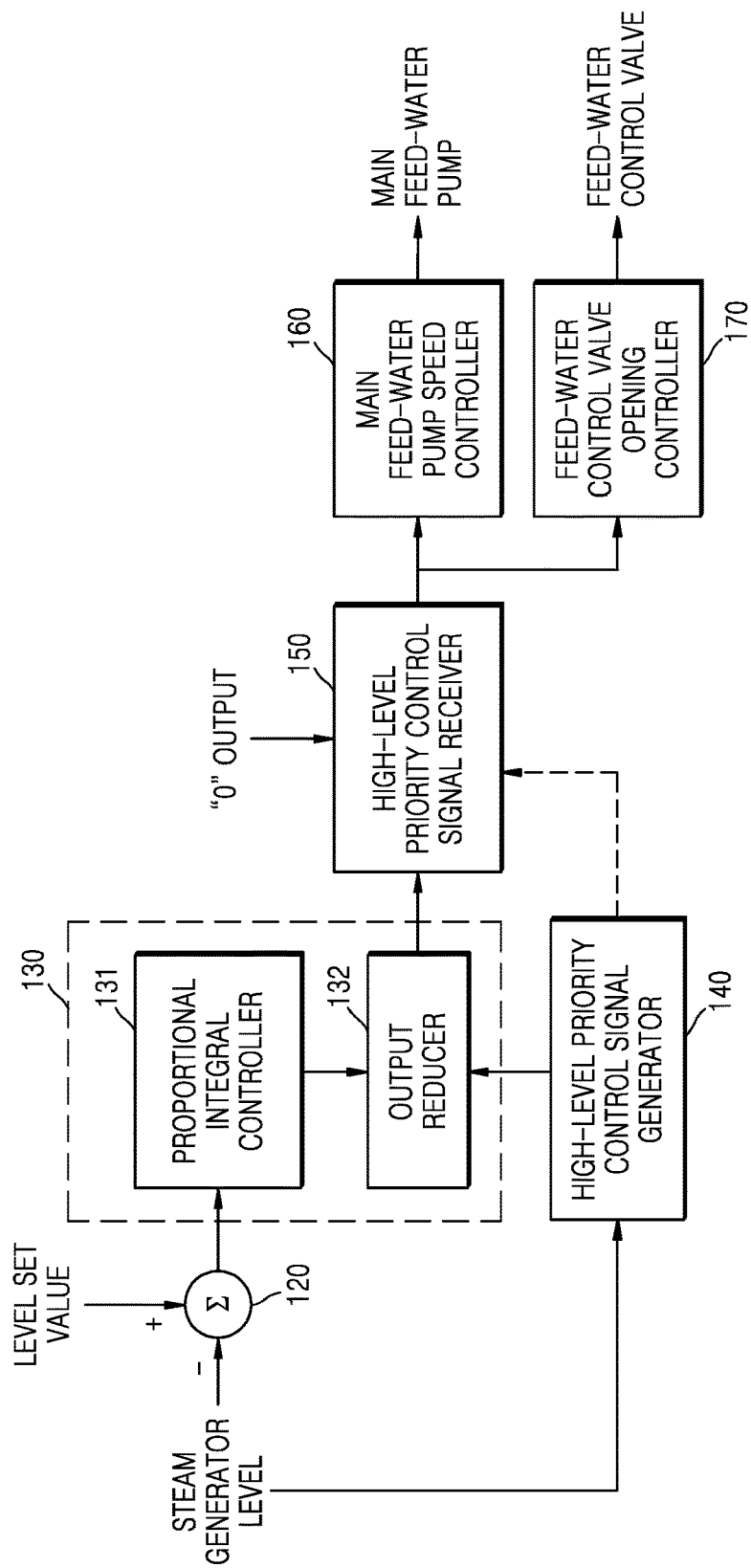
FIG. 4 illustrates another example of the embodiment described with reference to FIG. 2.

The proportional integral controller 131 and the output reducer 132 may be disposed as shown in FIG. 3 or 4.

As shown in FIG. 3, the output reducer 132 may be connected to both to the high-level priority control signal generator 140 and the proportional integral controller 131, so that the output reducer 132 receives a signal from the high-level priority control signal generator 140 and outputs a signal, which is to control an output from the proportional integral controller 131, to the proportional integral controller 131, and thus, an output from the proportional integral controller 131 is controlled by the output reducer 132 after the output reducer 132 has received a signal from the high-level priority control signal generator 140.

As another method, as shown in FIG. 4, the output reducer 132 may be disposed at a rear end of the proportional integral controller 131, so that the output reducer 132 receives a value output to the proportional integral controller 131, and reduces a proportional integral control value received according to an output signal from the high-level priority control signal generator 140 and outputs the reduced proportional integral control value.

A time period for which the output reducer 132 reduces an output from the proportional integral controller 131 may be determined by time, a steam generator level, or an output value of the proportional integral controller 131 (a proportional integral control value).

As an example of reducing an output from the proportional integral controller 131 with reference to time, if a high-level priority control mode is deactivated, the output reducer 132 may reduce an output value of the proportional integral controller 131 during a time period which is preset by a system operator.

In this case, an output value may be reduced at a predetermined rate with reference to the output value or reduced in correspondence with a predetermined value. A reduction rate may be 50%.

Additionally, an output value may be reduced at a constant rate or in correspondence with a constant value during a time period for which the output value is reduced, or a reduction rate or a reduced value may be gradually decreased.

As an example of reducing an output from the proportional integral controller 131 with reference to a steam generator level, even if a high-level priority control mode is deactivated as a steam generator level is decreased, an output from the proportional integral controller 131 may be reduced until before the steam generator level becomes equal to or less than a predetermined value.

For example, assuming that a high-level priority control mode is activated when a steam generator level is 85%, and that the high-level priority control mode is deactivated when the steam generator level is 80%, even when the steam generator level is equal to or less than 80%, if the steam generator level is equal to or less than 75%, an output from the proportional integral controller 131 may be reduced.

In this case, an output from the proportional integral controller 131 may be reduced at a constant rate or in correspondence with a constant value until before the steam generator level becomes equal to or less than a predetermined value. Alternately, a reduced rate or value may be decreased as the steam generator level is reduced.

A purpose an exemplary embodiment is to prevent oscillation of a steam generator level which may occur after a high-level priority mode is deactivated.

According to an exemplary embodiment, the output reducer 132 reduces an output from the proportional integral controller 131 for a certain time period right after a high-level priority control mode is deactivated. Accordingly, in the above-described example, an output from the proportional integral controller 131 is not reduced simply because a steam generator level is equal to or greater than 75%, and an output from the proportional integral controller 131 is reduced if a steam generator level is equal to or greater than 75% in a time period when a set condition is met after a high-level priority control mode is deactivated.

Figure 5:
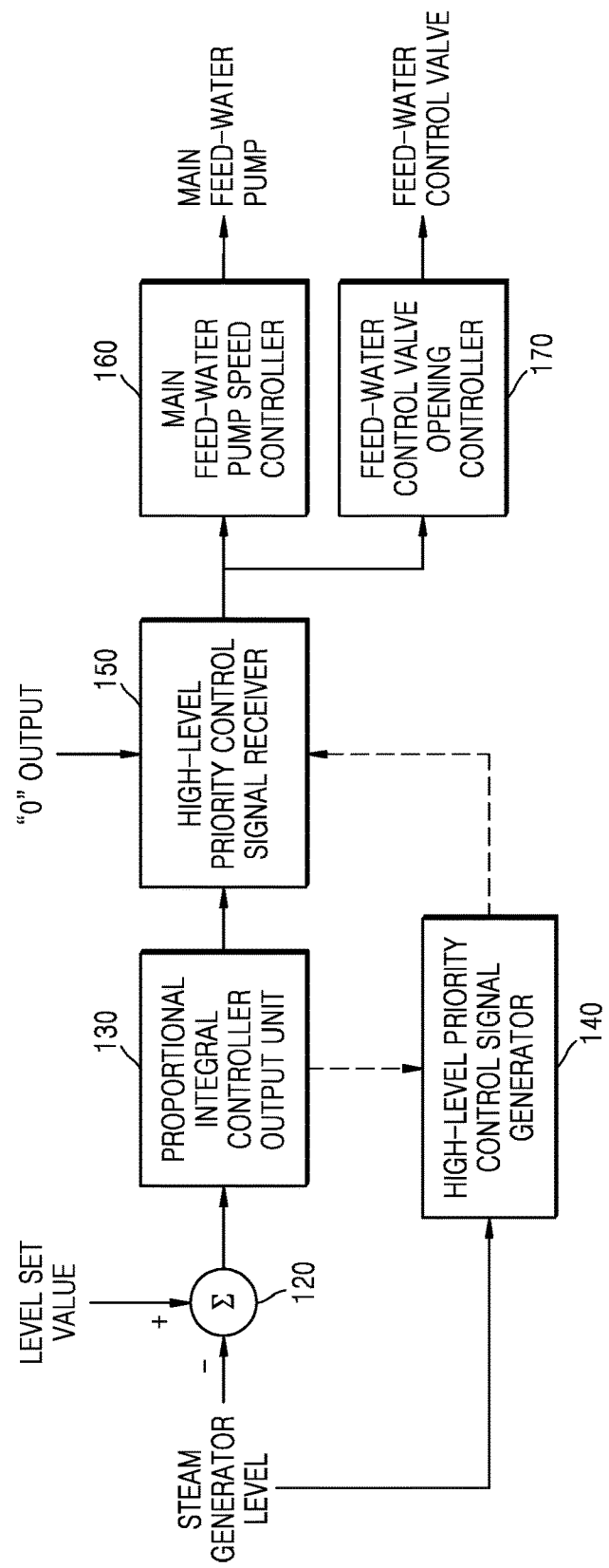
FIG. 5 is a block diagram of a configuration of the steam generator level control system according to another exemplary embodiment.

FIG. 5 is a block diagram of a configuration of a steam generator level control system according to another exemplary embodiment.

According to exemplary embodiments described with reference to FIGS. 2 through 4, an output from the proportional integral controller 131 is reduced after a high-level priority control mode is deactivated. However, according to another exemplary embodiment described with reference to FIG. 5, oscillation of a steam generator level is prevented by using a method of setting a dead band, the setting being performed by the high-level priority control signal generator 140.

In detail, the steam generator level control system, shown in FIG. 5, includes the comparator 120, the proportional integral control output unit 130, the high-level priority control signal generator 140, the high-level priority control signal receiver 150, the main feedwater pump speed controller 160, and the feedwater control valve opening controller 170.

The proportional integral control output unit 130 outputs a proportional integral control value, as described with reference to FIG. 2. The high-level priority control signal generator 140 receives an input of an output value of the proportional integral controller 131, and then, controls the high-level priority control signal receiver 150 not to output a high-level priority control signal for a certain time period after a high-level priority control mode is deactivated until an output value of the proportional integral control output unit 130 is reduced sufficiently.

The time period may be a fixed time period, or may be changed according to an output value of the proportional integral control output unit 130. If the time period may be changed, the time period may be determined as a time period until an output value of the proportional integral control output unit 130 is reduced to a value equal to or less than a predetermined value.

A range of an output value of the proportional integral control output unit 130, in which a high-level priority control signal is not output, may be determined by a system operator or developer.

Figure 6:
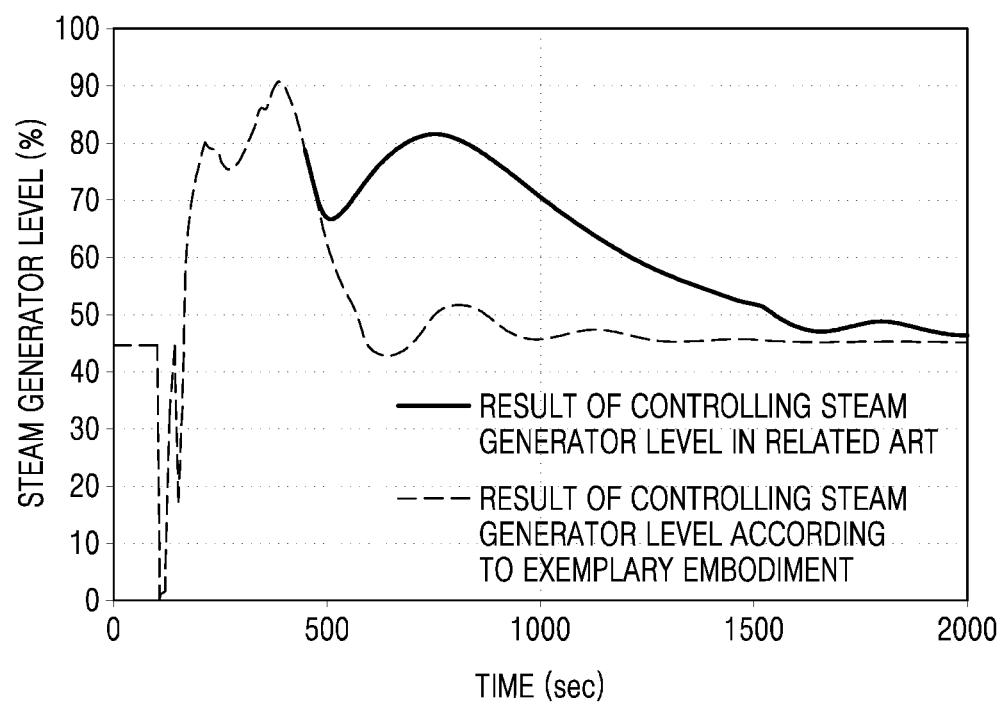
FIG. 6 is a graph showing a comparison between a result of controlling a steam generator level according to an exemplary embodiment and a result of controlling a steam generator level in the related art.

FIG. 6 is a graph showing a comparison between a result of controlling a steam generator level according to an exemplary embodiment and a result of controlling a steam generator level in the related art. FIG. 6 shows a comparison between a result of the controlling according an exemplary embodiment described with reference to FIG. 2 and a result described with reference to FIG. 1.

As shown in FIG. 6, according to an exemplary embodiment, it may be understood that oscillation of a steam generator level is remarkably decreased after a high-level priority control signal is generated.

According to an exemplary embodiment, oscillation of a steam generator level, which may be caused by frequently turning a high-level priority control signal ON/OFF, may be prevented by controlling an output value of a proportional integral controller included in a feedwater control system when the steam generator level control system enters a high-level priority control mode due to a high steam generator level. Thus, a sudden shutdown of a nuclear reactor which may be caused by the oscillation of a steam generator level may be prevented in advance.

The inventive concept can also be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A steam generator level control system configured to prevent oscillation of a steam generator level at a nuclear power plant, the steam generator level control system comprising:

a comparator configured to compare a steam generator level with a predetermined level-set value;

a proportional integral control output unit configured to generate a proportional integral control value by using an output from the comparator;

a high-level priority control signal generator configured to output a signal instructing to enter a high-level priority control mode if the steam generator level is equal to or greater than first criteria, and output a signal deactivating the high-level priority control mode if the steam generator level is equal to or less than second criteria after the steam generator level is equal to first criteria; and a high-level priority control signal receiver configured to control a control signal using the proportional integral control value of the proportional integral control output unit to be transmitted to a main feedwater pump and a feedwater control valve in a normal mode, obstruct a control signal using a value of the proportional integral control output unit in the high-level priority control mode, and control a predetermined output value to be transmitted to the main feedwater pump and the feedwater control valve, wherein the proportional integral control output unit comprises:

a proportional integral controller configured to generate a proportional integral control value by using an output from the comparator; and an output reducer configured to control the proportional integral controller to generate, for a certain time, the proportional integral control value lower than the proportional integral control value in the normal mode if a high-level priority control mode is deactivated according to a signal from the high-level priority control signal generator, wherein the output reducer reduces the proportional integral control value until the steam generator level is reduced to a value equal to or less than a predetermined value after the high-level priority control mode is deactivated.

* * * * *